(12) United States Patent
Kopecek et al.

(10) Patent No.: US 11,441,514 B2
(45) Date of Patent: Sep. 13, 2022

(54) TERTIARY LOCK

(71) Applicant: Woodward, Inc., Fort Collins, CO (US)

(72) Inventors: Joseph Thomas Kopecek, Santa Clarita, CA (US); Julian Sweet, Pasadena, CA (US)

(73) Assignee: Woodward, Inc., Fort Collins, CO (US)

( * ) Notice: Subject to any disclaimer, the term of this patent is extended or adjusted under 35 U.S.C. 154(b) by 1002 days.

(21) Appl. No.: 16/149,455

(22) Filed: Oct. 2, 2018

(65) Prior Publication Data

US 2020/0102909 A1 Apr. 2, 2020

(51) Int. Cl.
*F02K 1/76* (2006.01)
*E05B 47/06* (2006.01)

(52) U.S. Cl.
CPC .......... *F02K 1/766* (2013.01); *E05B 47/0603* (2013.01); *F02K 1/763* (2013.01); *F05D 2270/52* (2013.01); *F05D 2270/62* (2013.01); *F05D 2270/66* (2013.01)

(58) Field of Classification Search
CPC . F02K 1/766; F02K 1/763; F02K 1/72; F02K 1/70; F05D 2270/52; F05D 2270/62; F05D 2270/66; E05B 47/0603; E05B 47/0607
See application file for complete search history.

(56) References Cited

U.S. PATENT DOCUMENTS

| | | | |
|---|---|---|---|
| 2,805,584 A | 9/1957 | Hinsey | |
| 3,040,524 A | 6/1962 | Kurti | |
| 3,186,308 A | 6/1965 | Butterworth | |
| 3,344,604 A | 10/1967 | Mattia et al. | |
| 3,444,783 A | 5/1969 | Fredd | |
| 3,500,645 A | 3/1970 | Hom | |
| 3,511,055 A | 5/1970 | Timms | |
| 4,391,409 A | 7/1983 | Scholz | |
| 4,421,349 A | 12/1983 | Greiert, Jr. | |

(Continued)

FOREIGN PATENT DOCUMENTS

| | | |
|---|---|---|
| CN | 102140873 | 8/2011 |
| CN | 102587748 | 7/2012 |

(Continued)

OTHER PUBLICATIONS

PCT International Preliminary Report on Patentability in International Appln. No. PCT/US2019/053831, dated Apr. 15, 2021, 8 pages.

(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, a thrust reverser tertiary lock apparatus that includes a probe affixed to an aircraft engine frame and having a shaft having a barb at a first end and configurable to a first configuration and a second configuration, and a receiver affixed to a thrust reverser transcowl slider configured to accommodate the barb and having an end wall with an aperture defined therein, the aperture shaped to permit escapement of the barb in the first configuration and prevent escapement of the barb in the second configuration.

6 Claims, 14 Drawing Sheets

(56) References Cited

U.S. PATENT DOCUMENTS

| | | |
|---|---|---|
| 4,922,713 A | 5/1990 | Barbarin et al. |
| 5,257,840 A | 11/1993 | Rouzaud |
| 5,404,714 A | 4/1995 | Davies |
| 5,431,085 A | 7/1995 | Geffray |
| 5,642,636 A | 7/1997 | Mitsui |
| 6,021,636 A | 2/2000 | Johnson et al. |
| 6,089,626 A | 7/2000 | Shoemaker |
| 6,487,846 B1 | 12/2002 | Chakkera et al. |
| 6,517,041 B2 | 2/2003 | Raum |
| 6,584,763 B2 | 7/2003 | Lymons et al. |
| 7,409,820 B2 | 8/2008 | Ahrendt |
| 8,018,696 B2 | 9/2011 | Ahrendt |
| 8,713,911 B2 | 5/2014 | Kopecek et al. |
| 8,919,668 B2 | 12/2014 | Vauchel |
| 9,109,536 B2 | 8/2015 | Willett |
| 9,249,756 B2 | 2/2016 | Caruel |
| 9,458,794 B2 | 10/2016 | Hue et al. |
| 9,587,516 B2 | 3/2017 | Fabre et al. |
| 9,689,345 B2 | 6/2017 | Kopecek |
| 10,054,079 B2 | 8/2018 | Kopecek et al. |
| 10,247,138 B2 | 4/2019 | Kopecek |
| 10,865,738 B2 | 12/2020 | Kopecek et al. |
| 2007/0273159 A1 | 11/2007 | Rouyer |
| 2008/0073172 A1 | 3/2008 | Ho |
| 2010/0031629 A1 | 2/2010 | Vauchel |
| 2010/0089191 A1 | 4/2010 | Marin Martinod |
| 2011/0014044 A1* | 1/2011 | Vauchel ............... B64D 29/06 415/214.1 |
| 2013/0091825 A1 | 4/2013 | Joret et al. |
| 2013/0263600 A1 | 10/2013 | Vauchel |
| 2013/0292489 A1 | 11/2013 | Vauchel et al. |
| 2014/0270935 A1 | 9/2014 | Willett |
| 2015/0121895 A1* | 5/2015 | Suciu .................. F02K 1/64 60/796 |
| 2015/0267639 A1 | 9/2015 | Gormley |
| 2016/0131081 A1* | 5/2016 | Maalioune ............ F02K 1/766 239/265.19 |
| 2016/0363098 A1 | 12/2016 | Kopecek |
| 2017/0268460 A1 | 9/2017 | Kopecek |
| 2018/0066607 A1 | 3/2018 | Sawyers-Abbott et al. |
| 2018/0202390 A1 | 8/2018 | Kopecek et al. |
| 2020/0271072 A1 | 8/2020 | Kopecek et al. |

FOREIGN PATENT DOCUMENTS

| | | |
|---|---|---|
| CN | 104334451 | 2/2015 |
| EP | 1043492 | 10/2000 |
| EP | 1286037 A1 | 2/2003 |
| EP | 3284677 | 2/2018 |
| FR | 2970521 A1 | 7/2012 |
| GB | 404618 A | 1/1934 |
| GB | 795044 | 5/1958 |
| JP | 2001063410 | 3/2001 |
| WO | WO01 19674 | 3/2001 |
| WO | WO2005040589 | 5/2005 |
| WO | WO2014158852 | 10/2014 |
| WO | WO2014196985 | 12/2014 |
| WO | WO2015096000 | 7/2015 |
| WO | WO2016024274 | 2/2016 |

OTHER PUBLICATIONS

International Search Report and Written Opinion in the International Application No. PCT/US2020/019902, dated Jun. 22, 2020, 16 pages.

PCT International Search Report and Written Opinion of the International Searching Authority issued in International Application No. PCT/US2016/036381 dated Aug. 26, 2016; 16 pages.

International Search Report and Written Opinion in International Application No. PCT/US2019/053831, dated Dec. 2, 2019, 16 pages.

International Preliminary Report on Patentability in International Appln. No. PCT/US2020/019902, dated Sep. 10, 2021, 10 pages.

Office Action in Chinese Appln. No. 201680047185.9, dated Aug. 4, 2020, 8 pages (with English Translation).

Office Action in European Appln. No. EP 20714764.6, dated Feb. 10, 2022, 5 pages.

Office Action in Japanese Appln. No. 2017-564113, dated Mar. 30, 2020, 7 pages (with English Translation).

Search Report in Chinese Appln. No. 201680047185.9, dated Jul. 26, 2020, 6 pages (with English Translation).

* cited by examiner

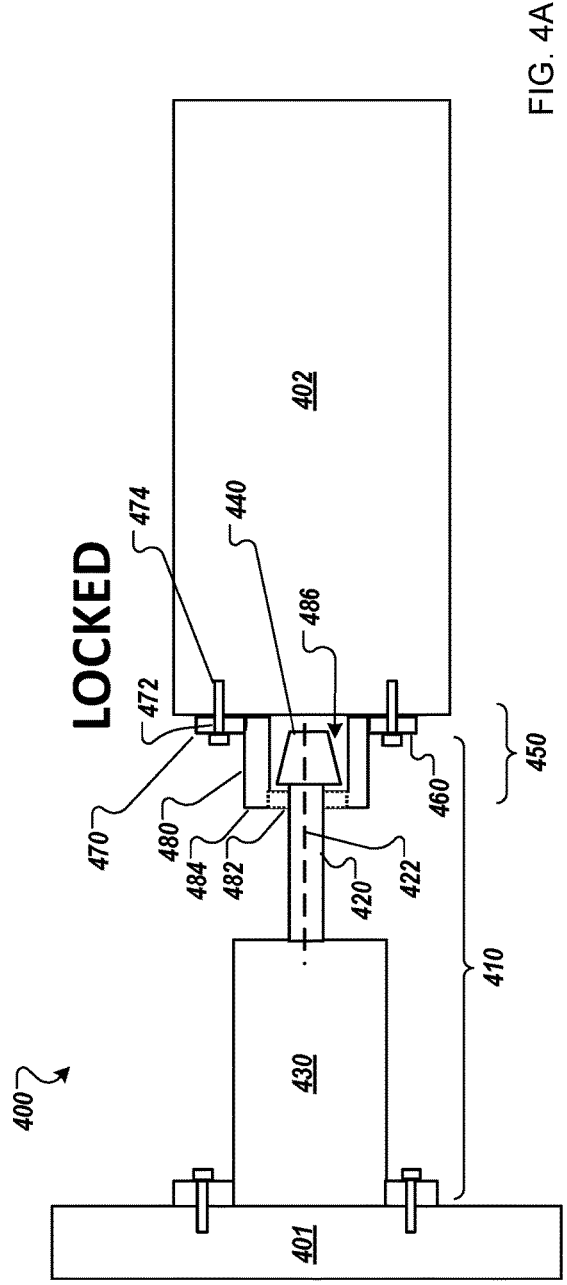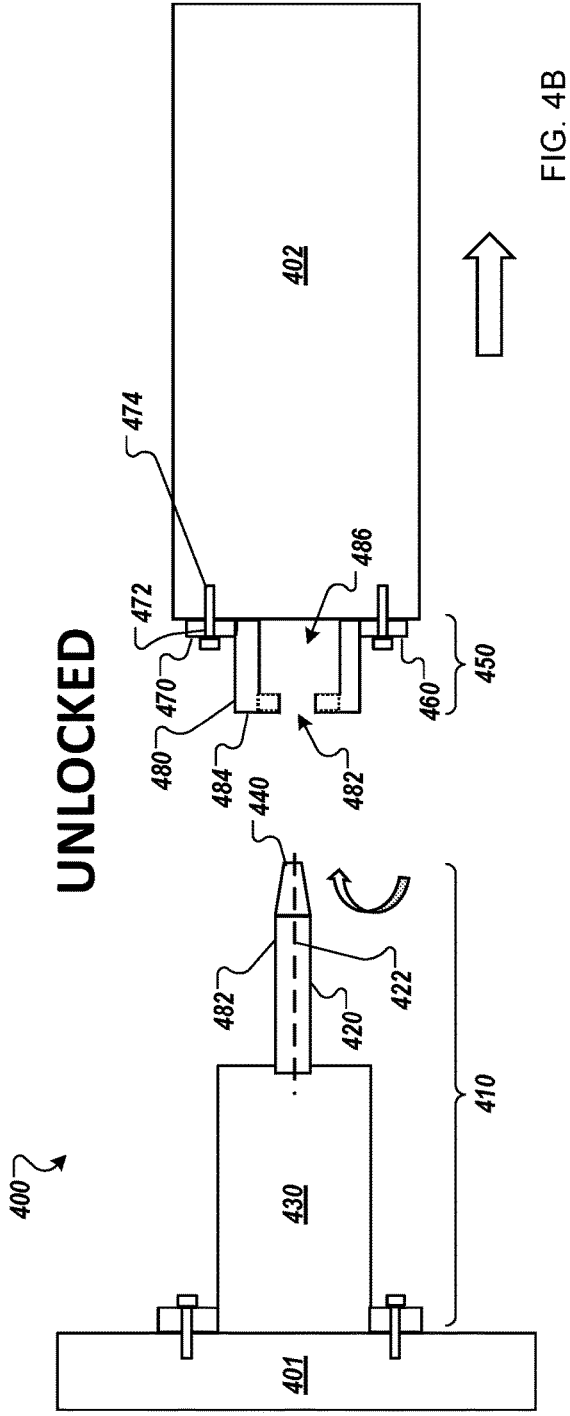

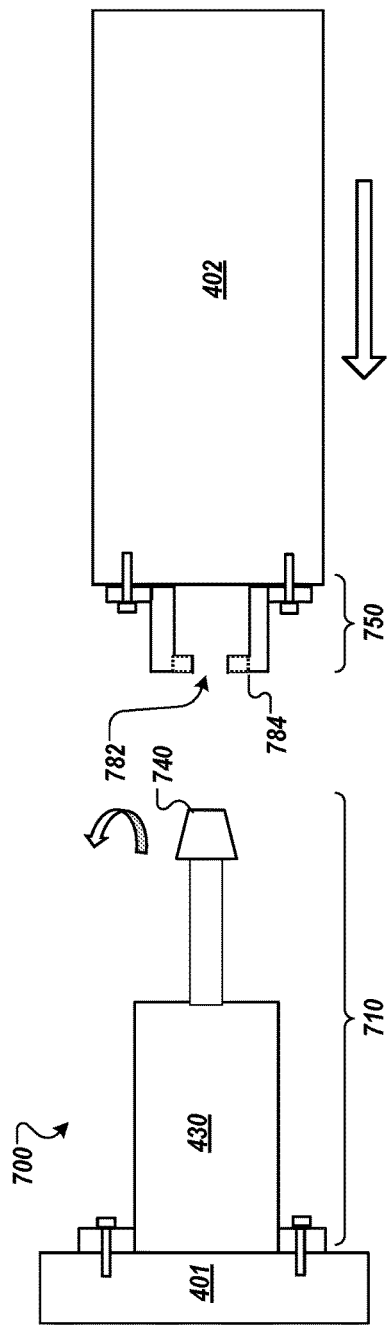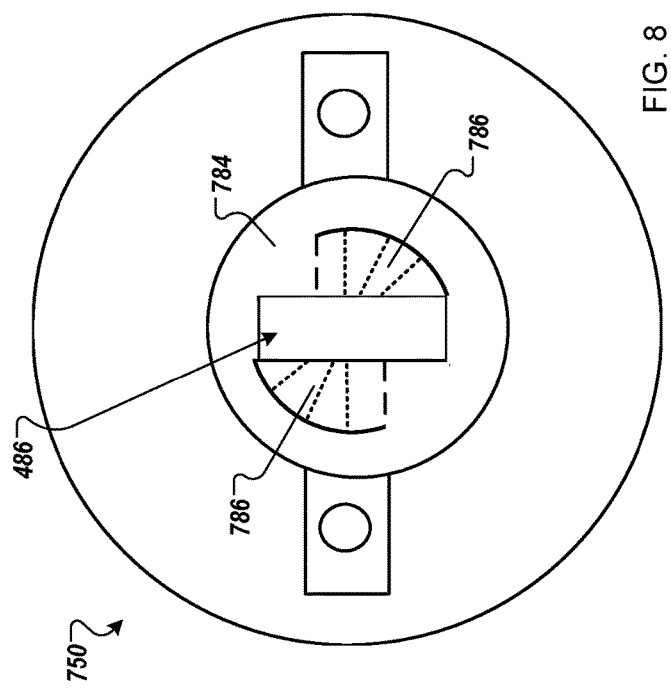

TERTIARY LOCK

TECHNICAL FIELD

This instant specification relates to an aircraft thrust reverser actuation locking system.

BACKGROUND

Contemporary aircraft engines may include a thrust reverse actuation system to assist in reducing the aircraft speed during landing. Typical thrust reversers include a movable transcowl that, when in the active position, reverses at least a portion of the airflow passing through the engine.

Accidental or inadvertent activation and deployment of thrust reversers at inappropriate times can be dangerous or deadly. Accidental deployment on the ground while ground crews are performing service on the engine can result in injury or death. Accidental activation during flight can cause a catastrophic loss of airspeed or failure of the airframe. Mechanical malfunctions, such as a loss of hydraulic pressure, can also allow a reverser to move out of the stowed position at an inappropriate time.

To prevent accidental or unintentional thrust reverser deployment, locking mechanisms are used. Before the thrust reverser can be moved from its stowed position, the lock must first be disengaged. Some current reverser lock designs implement rotating jaws to engage a probe. Such designs can be heavy and mechanically complex, which adds weight and maintenance requirements to the aircraft on which they are installed.

SUMMARY

In general, this document describes an aircraft thrust reverser actuation locking system.

In a first aspect, a thrust reverser tertiary lock apparatus includes a probe affixed to an aircraft engine frame and having a shaft having a barb at a first end and configurable to a first configuration and a second configuration, and a receiver affixed to a thrust reverser transcowl slider configured to accommodate the barb and having an end wall with an aperture defined therein, the aperture shaped to permit escapement of the barb in the first configuration and prevent escapement of the barb in the second configuration.

Various embodiments can include some, all, or none of the following features. The thrust reverser tertiary lock apparatus can include a rotary actuator configured to rotate the barb about an axis, wherein the barb is rotatable by the rotary actuator between the first configuration and the second configuration. The aperture can be rotationally asymmetric relative to the axis and the barb is rotationally asymmetric about the axis between the first configuration and the second configuration, such that the barb is escapable from the receiver through the aperture in the first configuration and the barb is interfered with by the end wall such that escapement of the barb is prevented in the second configuration. The barb can include at least one arm having a first end connected to the shaft and a second end that is biased away from the shaft, wherein the arm defines the rotational asymmetry of the barb. The first end can be pivotably connected to the shaft and configured to contact an edge of the aperture and pivot axially to pass through the aperture during penetration of the end wall by the barb in the second configuration, and configured to pivot away from the shaft and interfere with escapement of the barb in the second configuration. The barb can be configured to rotate to the first configuration when activated and rotate to the second configuration when deactivated. The barb can be a bevel configured to contact an edge of the aperture and urge rotation of the barb about the axis from the second configuration to the first configuration during penetration of the aperture by the barb. An edge of the aperture can include a bevel configured to contact the barb and urge rotation of the barb about the axis from the second configuration to the first configuration during penetration of the aperture by the barb. The thrust reverser tertiary lock apparatus can also include a torsion bias spring configured to rotate the barb about the axis from the first configuration to the second configuration after the barb has completed penetration of the bevel. The barb can have a first size in the first configuration and can have a second size in the second configuration, wherein the first size is smaller than the aperture such that the barb is able to penetrate and escape the aperture in the first configuration, and the second size is larger than the aperture such that the barb is retained by the receiver and escapement of the barb through the aperture is prevented by interference between the barb and the end wall in the second configuration. The barb can be spring biased towards the second size. The probe can include a linear actuator, and the barb has at least one arm linked to the linear actuator, wherein the linear actuator is configured to extend the arm from the first configuration in which the arm extends from the shaft a first distance to define the first size, to the second configuration in which the arm extends from the shaft a second distance greater than the first distance to define the second size.

In a second aspect, a method of operating a thrust reverser tertiary lock includes locking a thrust reverser tertiary lock by penetrating, by a barb at a first end of a shaft of a probe, an aperture defined in an end wall of a receiver shaped to accommodate the barb, configuring the barb to a first configuration, and preventing, by the end wall, escapement of the barb though the aperture in the first configuration, and unlocking the thrust reverser tertiary lock by configuring the barb to a second configuration, and permitting escapement of the barb through the aperture in the second configuration.

Various implementations can include some, all, or none of the following features. Locking the thrust reverser tertiary lock can also include configuring, while in an escaped configuration, the barb to the first configuration, contacting the barb to an edge of the aperture, wherein contact between the barb and the edge urges the barb from the first configuration to the second configuration, penetrating, by the probe, the aperture, and reconfiguring, after the barb has passed through the aperture, the barb to the first configuration. The barb can include a bevel configured to contact the edge of the aperture and urge rotation of the barb about a primary axis of the shaft from the first configuration to the second configuration during penetration of the aperture by the barb. The edge of the aperture can include a bevel configured to contact the barb and urge rotation of the barb about a primary axis of the shaft from the first configuration to the second configuration during penetration of the aperture by the barb. Reconfiguring, after the barb has passed through the aperture, the barb to the first configuration, can also include rotating, by a torsion bias spring, the barb about the axis from the first configuration to the second configuration after the barb has completed penetration of the bevel. The barb can include an arm having a first end that is pivotably connected to the shaft and configured to contact an edge of the aperture and pivot toward the shaft from the first configuration to the second configuration to pass through the aperture during penetration of the end wall by the barb, and configured to pivot away from the shaft from the second configuration to the first configuration and interfere with escapement of the barb in the first configuration. Configuring the barb to the first configuration can include rotating, by a rotary actuator, the barb about an axis from a second rotary position to a first rotary position. Configuring the barb to the second configuration can include rotating, by a rotary actuator, the barb about an axis from a first rotary position to a second rotary position. The barb can have a first size in the first configuration and has a second size in the second configuration, wherein the second size is smaller than the aperture such that the barb is able to penetrate and escape the aperture in the second configuration, and the first size is larger than the aperture such that the barb is retained by the receiver and escapement of the barb through the aperture is prevented by interference between the barb and the end wall in the first configuration, and wherein configuring the barb to the first configuration can include actuating, by a linear actuator, at least one arm linked to the linear actuator, extending, based on the actuating, the arm from the second configuration in which the arm extends from the shaft a first distance to define the first size, to the first configuration in which the arm extends from the shaft a second distance greater than the first distance to define the second size. The barb can have a first size in the first configuration and has a second size in the second configuration, wherein the second size is smaller than the aperture such that the barb is able to penetrate and escape the aperture in the second configuration, and the first size is larger than the aperture such that the barb is retained by the receiver and escapement of the barb through the aperture is prevented by interference between the barb and the end wall in the first configuration, and wherein configuring the barb to the first configuration can include actuating, by a linear actuator, at least one arm linked to the linear actuator, and retracting, based on the actuating, the arm from the first configuration in which the arm extends from the shaft a first distance to define the first size, to the second configuration in which the arm extends from the shaft a second distance less than the first distance to define the second size. The barb can be spring-biased to the first size.

The systems and techniques described here may provide one or more of the following advantages. First, the system replaces a conventional two-piece, jaws-type lock mechanism with a much simpler rotary-type design. Second, the system uses a rotary mechanism that is smaller and less complex than the large and heavy moving jaws of jaws-type lock mechanism designs. Third, the system uses a one moving piece mechanism instead of the complex slot and bearing mechanism that is used to swing the jaws of a jaws-type lock. Fourth, the system is lighter and more reliable than jaws-type lock mechanism.

The details of one or more implementations are set forth in the accompanying drawings and the description below. Other features and advantages will be apparent from the description and drawings, and from the claims.

DESCRIPTION OF DRAWINGS

FIG. 4A is a sectional side view of an exemplary thrust reverser tertiary lock in a locked configuration.

FIG. 4B is a sectional side view of an exemplary thrust reverser tertiary lock in an unlocked configuration.

FIG. 7 is a side view of an exemplary thrust reverser tertiary lock in a locked configuration while escaped.

FIG. 8 is a front view of an exemplary receiver with bevels.

DETAILED DESCRIPTION

This document describes systems and techniques for reversing aircraft turbine engine airflow. A thrust reverser with at least one movable element, which is movable to and from a reversing position, may be used to change the direction of the bypass airflow. In the reversing position, the movable element may be configured to reverse at least a portion of the bypass airflow.

Locking mechanisms engage the thrust reversers to prevent accidental activation or accidental deployment (e.g., during flight, during ground maintenance operations). The paragraphs below describe a mechanism that provides such locking in an assembly that is relatively lighter and less complex than existing designs.

Figure 1:
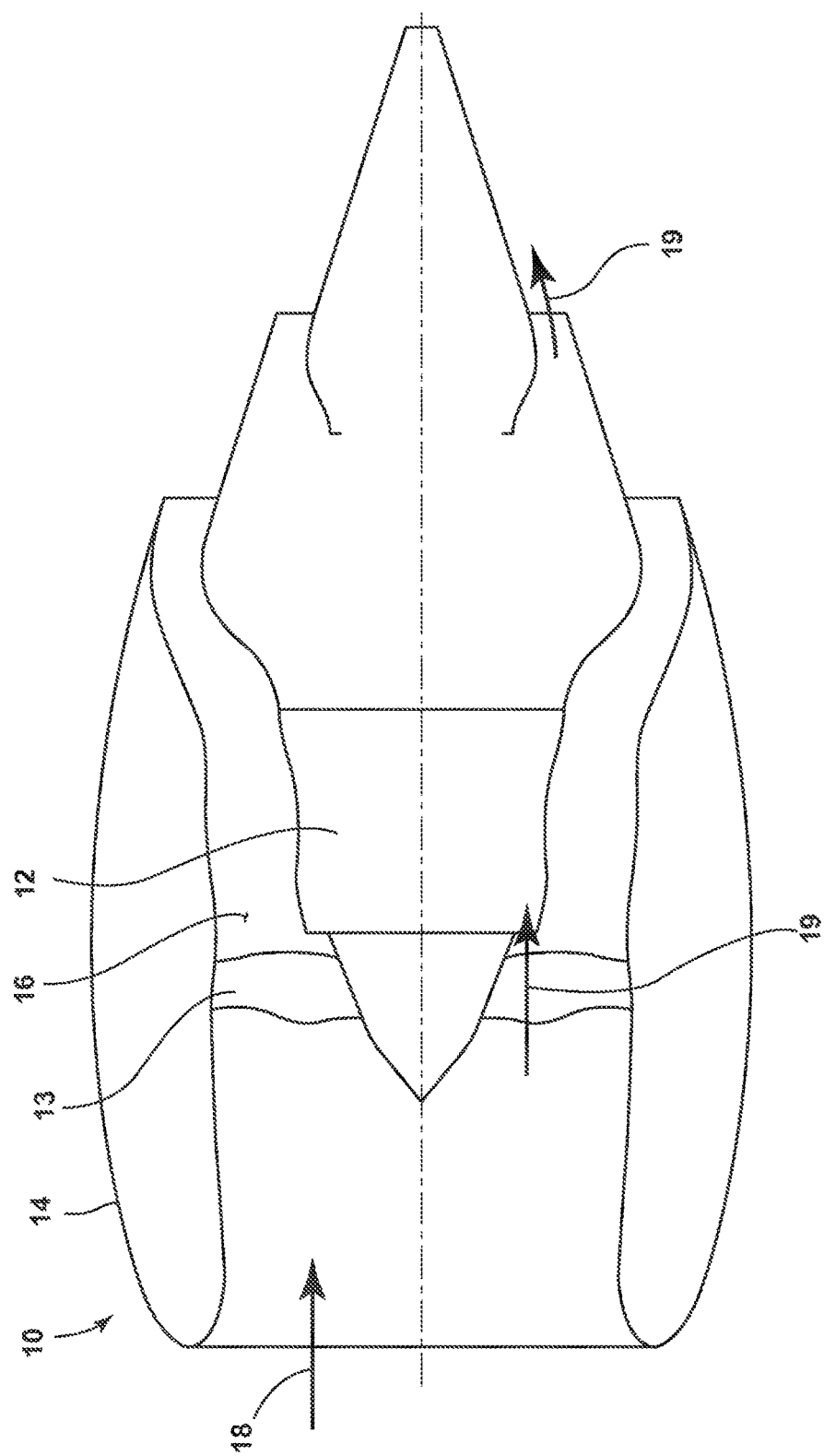
FIG. 1 is a schematic view of an example turbofan jet engine with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path as schematically illustrated by the arrow 18. A combustion airflow is schematically illustrated by the arrows 19.

Figure 2:
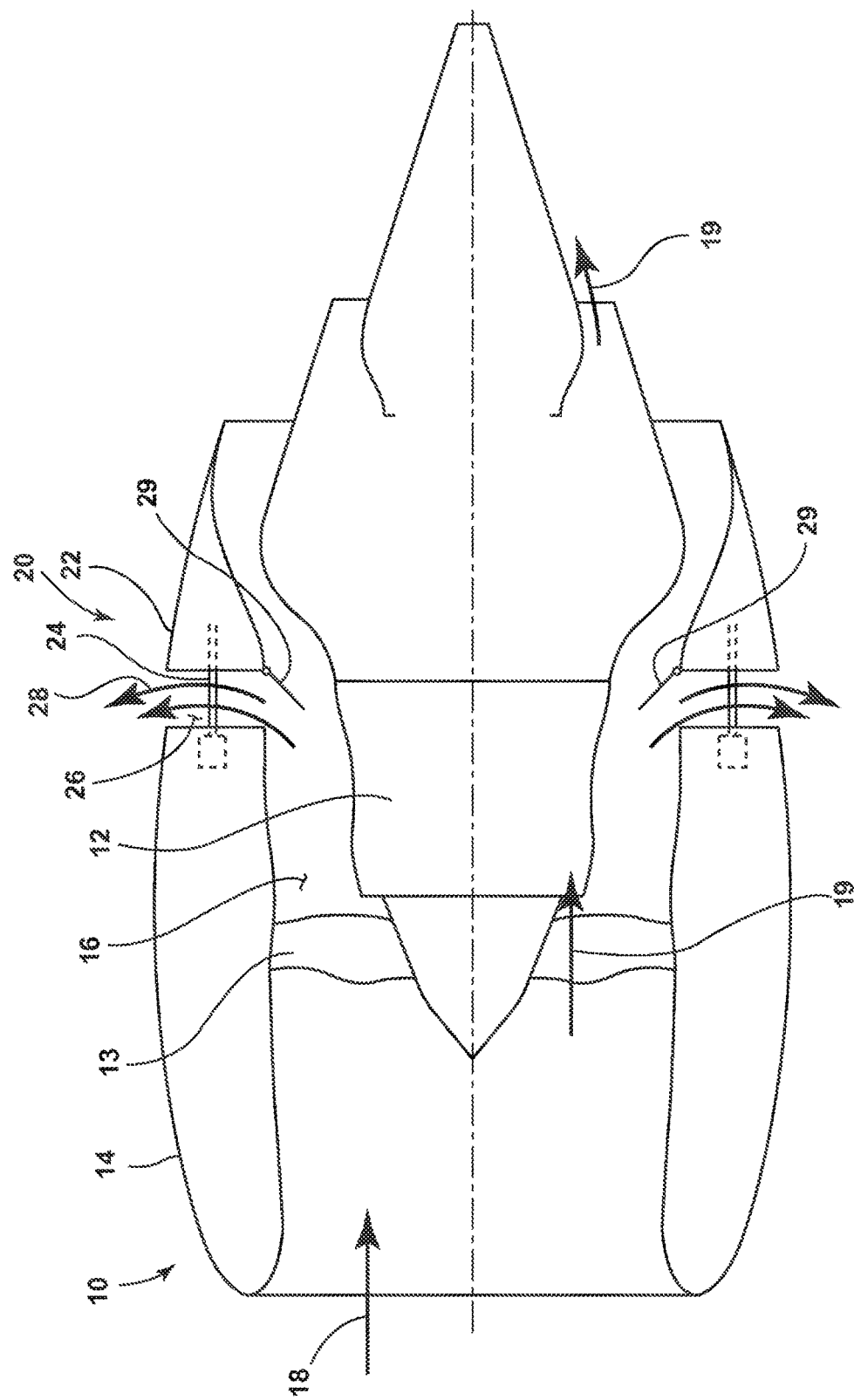
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap (also known as a blocker door) 29 may be included to aid in directing the airflow path between the movable element 22 and the forward portion of the nacelle 14.

Figure 3:
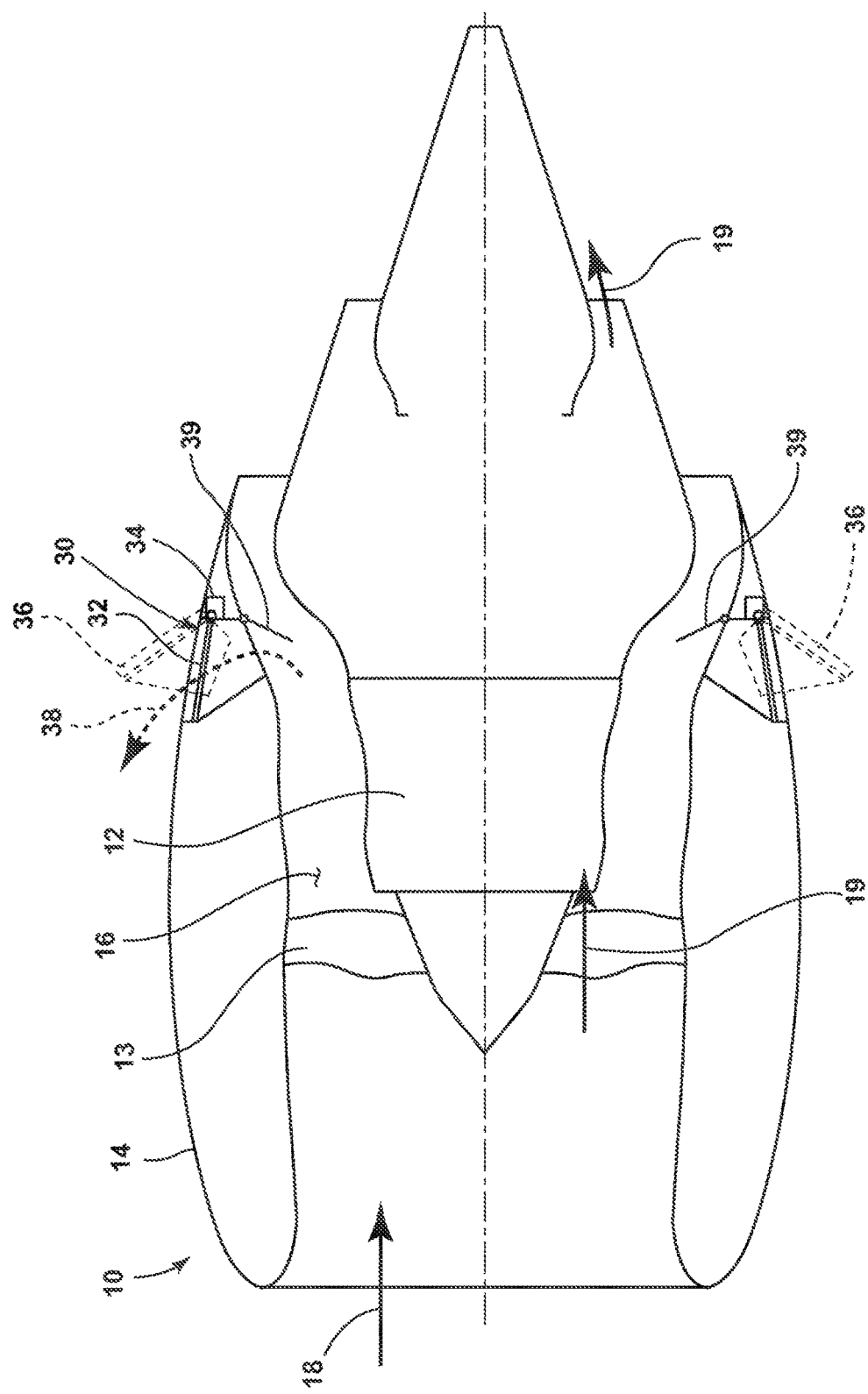
FIG. 3 is a schematic view of the engine of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector, blocker door, or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

FIG. 4A is a sectional side view of an exemplary thrust reverser tertiary lock system 400 in a locked configuration. FIG. 4B is a sectional side view of the exemplary thrust reverser tertiary lock system 400 in an unlocked configuration. In some implementations, the thrust reverser tertiary lock system 400 is an apparatus that can be used to lock the example thrust reverser 20 or the example thrust reverser 30 of FIGS. 2 and 3.

The exemplary system 400 includes a probe assembly 410 and a receiver assembly 450. The probe assembly 410 is configured to be affixed to a structure 401, such as an airframe member or an aircraft engine frame. The receiver assembly 450 is configured to be affixed to a structure 402, such as a thrust reverser transcowl slider. In some embodiments, the probe assembly 410 can be affixed to the structure 402 and the receiver assembly 450 can be affixed to the structure 401.

The receiver assembly 450 includes a base 460 and an affixment point 470 affixed to the base 460. The affixment points 470 provide bores through which two fasteners 472 (e.g., bolts, screws) are passed to removably affix the base to the structure 402.

A housing 480 is also affixed to the base 460. The housing 480 includes an aperture 482 formed in an end wall 484. A cavity 486 is defined within the housing 480, and is partly defined by the end wall 484.

Figure 5:
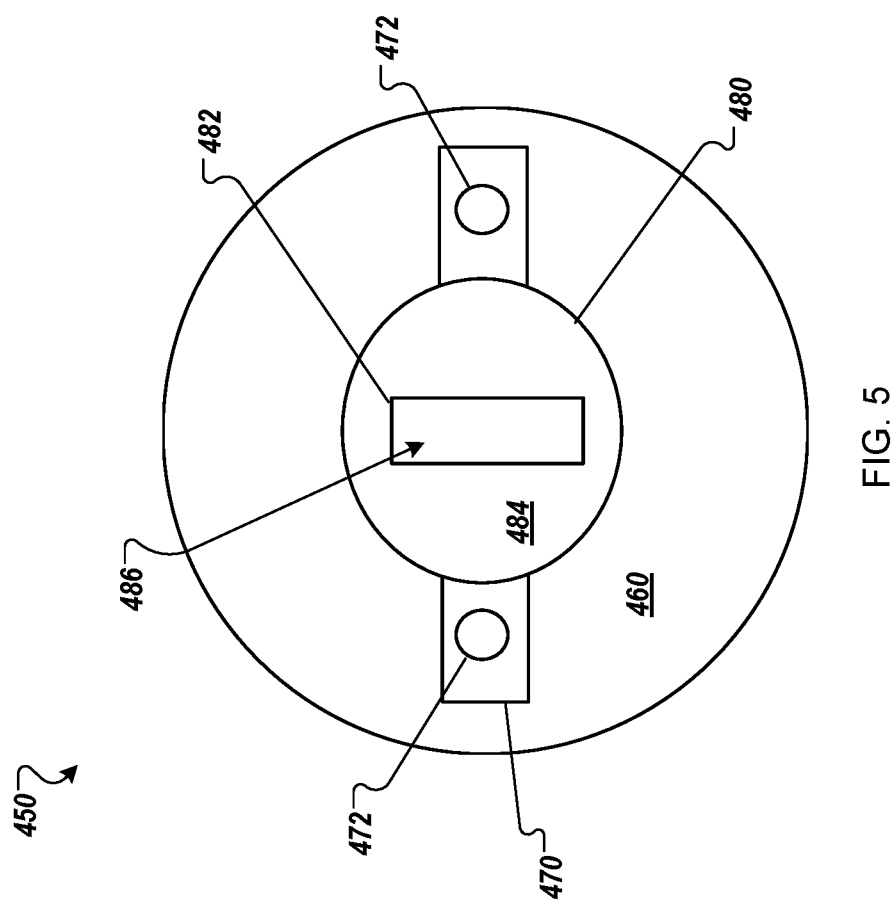
FIG. 5 is a front view of an exemplary receiver of a thrust reverser tertiary lock.

Referring now to FIG. 5, a front view of the exemplary receiver assembly 450 is shown. The aperture 482 is a rotationally asymmetrical opening in the end wall 484. For example, if the aperture 482 were to be rotated in the plane of FIG. 5, the shape of the aperture 482 would be different relative to the shape of the aperture 482 in its original position. In the illustrated example, the aperture 482 is rectangular (e.g., with a length that is greater than its width). In some embodiments, the aperture 482 can have other rotationally asymmetrical shapes that can be activated and partly rotated into a position that is asymmetrical relative to its original position (e.g., triangular, oval, trapezoidal, semi-cylindrical, polygonal).

Referring again to FIGS. 4A and 4B, the probe assembly 410 includes a shaft 420 defining a longitudinal axis 422. The shaft 420 is rotationally coupled at one end to a rotary actuator 430. The rotary actuator 430 is configured to activate and at least partly rotate the shaft 420 about the longitudinal axis between an unlocked configuration (e.g., a first rotational position) and a locked configuration (e.g., a second rotational position that is different from the first).

Figure 6A:
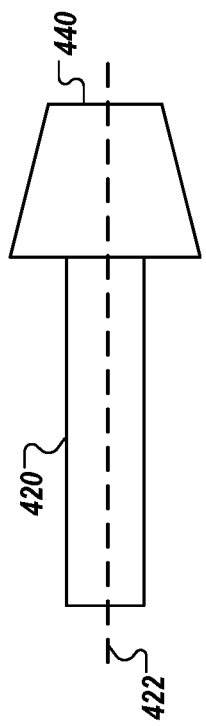
FIGS. 6A and 6B are side views of an exemplary probe of a thrust reverser tertiary lock in a locked and unlocked configuration.
Figure 6B:
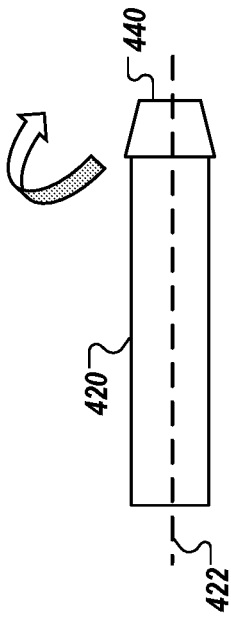
Figure 6C:
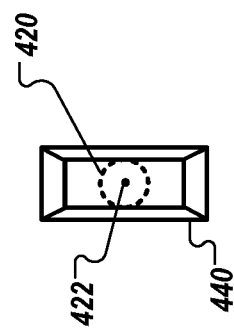
FIGS. 6C and 6D are end views of an exemplary probe of a thrust reverser tertiary lock in a locked and unlocked configuration.
Figure 6D:
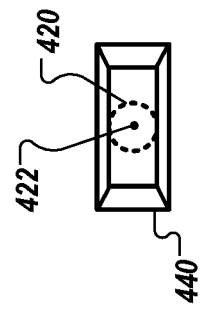

The shaft 420 includes a barb 440 at its other end, opposite the rotary actuator 430. Referring now to FIGS. 6A-6D, FIG. 6A is a magnified side view of the probe 410 the thrust reverser tertiary lock system 400 in an unlocked configuration, and FIG. 6B is a magnified side view of the probe 410 of the thrust reverser tertiary lock system 400 in a locked configuration. FIG. 6C is a magnified end view of the probe 410 the thrust reverser tertiary lock system 400 in an unlocked configuration, and FIG. 6D is a magnified end view of the probe 410 of the thrust reverser tertiary lock system 400 in a locked configuration.

The barb 440 is rotationally asymmetrical about the longitudinal axis 422. For example, when the shaft 420 is rotated, the orientation of the barb 440 can be changed to a position in that is not symmetrical about the longitudinal axis 422 relative to its original position. In the illustrated example, the barb 440 is rectangular (e.g., with a length that is greater than its width) when viewed end-on, such as shown in FIGS. 6C and 6D. In some embodiments, barb 440 can have other rotationally asymmetrical shapes that can be partly rotated into a position that is asymmetrical relative to its original position (e.g., triangular, oval, trapezoidal, semi-cylindrical, polygonal).

Referring again to FIG. 4A, when rotated into the locked configuration, the barb 440 mechanically interferes with the end wall 484 of the receiver assembly 450 and the receiver assembly 450 prevents escapement of the probe 410. For example, when the rectangular shape of the barb 440 is rotated relative to the shape of the aperture 482 (e.g., 90 degrees in the illustrated example), the barb 440 is retained with in the cavity 486. In such a locked, retained configuration, as shown in the illustrated example of FIG. 4A, the structure 402 is mechanically retained to the structure 401 through the system 400. In use, such a locked and retained configuration can be used to lock a moveable portion of a thrust reverser to an engine frame or airframe to prevent inadvertent or accidental deployment of the thrust reverser.

Referring again to FIG. 4B, when rotated into the unlocked configuration, the barb 440 can fit through the aperture 482, which permits escapement of the barb 440 from the cavity 486 through the end wall 484. In such an unlocked configuration, as shown in the illustrated example of FIG. 4B, the structure 402 is mechanically released from the structure 401. In use, such an unlocked configuration can permit movement of a moveable portion of a thrust reverser relative to an engine frame or airframe, for example, to permit deployment of the thrust reverser.

In some embodiments, the probe 410 may be configured to remain in the locked configuration by default. For example, regulatory agencies (e.g., the FAA) may require the system 400 to fail "safe" and keep the receiver assembly 450 locked to and engaged with the probe 410 if power to the rotary actuator 430 is lost. In some embodiments, the shaft 420 may be biased to the locked configuration by a torsion or linear spring. For example, the rotary actuator 430 may include a spring that is configured to urge the probe into the locked configuration. When the rotary actuator 430 is energized, the rotary actuator 430 overcomes the spring bias to unlock the probe 410. When the rotary actuator 430 is de-energized, the spring can urge the probe 410 back to the locked configuration.

FIG. 7 is a side view of an exemplary thrust reverser tertiary lock system 700 in a locked configuration while escaped. The system 700 is substantially similar to the exemplary thrust reverser tertiary lock system 400 of FIGS. 4A and 4B, except one or both of a barb 740 of a probe 710, and an end wall 784 of a receiver 750, are modified relative to the example barb 440 and the example end wall 484. The end wall 784 will be discussed further in the description of FIG. 8, and the barb 740 will be discussed further in the description of FIGS. 9A and 9B.

In the example system 400, the end wall 484 not only prevents escapement of the probe 410 from engagement with the receiver assembly 450 when locked, without modification the end wall 484 can also prevent engagement of the probe 410 with the receiver assembly 450 (e.g., penetration of the end wall 484 by the barb 440) when the probe 410 is locked and disengaged from the receiver assembly 450. However, in some implementations (e.g., under some regulatory environments), the system 700 may be configured to fail "safe" by permitting the structure 402 (e.g., a thrust reverser slider) to reengage and relock with the structure 401 (e.g., engine frame) even when the rotary actuator 430 has not been energized (e.g., by accident or by malfunction).

The exemplary system 700 includes modifications that can permit engagement of the probe 710 to the receiver 750 when locked and disengaged. For example, the system 700 can secure the structure 402 to the structure 401 even when the rotary actuator 430 has not be energized prior to retraction of the structure 402 (e.g., somebody forgot to unlock the probe 710 prior to retraction, the rotary actuator malfunctions and fails to move the probe 710 to the unlocked configuration during retraction).

Similar to the barb 440, the barb 740 is rotationally asymmetrical and can be rotated between a locked configuration and an unlocked configuration, and similar to the end wall 484, the end wall includes a rotationally asymmetrical aperture 782 that is configured to prevent escapement of the barb 740 from the receiver 750 in the locked configuration. However, without additional features such as those that will be discussed below, such a configuration can also prevent penetration of the end wall 784 by the barb 740 while the barb 740 is escaped and locked. The barb 740 and the end wall 784 include features that assist in urging the probe 710 from a locked configuration to an unlocked configuration when the receiver 750 is moved from an extended position toward a retracted position.

Referring now to FIG. 8, a front view of an exemplary receiver 750 is shown. The receiver 750 is substantially similar to the example receiver assembly 450, except that the end wall 784 includes a collection of bevels 786. The bevels 786 are configured as a helical or spiral slope that starts at the front face of the end wall 784, and slopes downward and rotationally though a portion of the thickness of the front face 784 to the aperture 482. When the receiver 750 is moved linearly toward the probe 710, the barb 740 contacts a portion of the bevels 786. The bevels 786 are configured to convert the linear motion between the receiver 750 and the probe 710 into rotary motion of the probe 710 (e.g., by urging rotation as the barb 740 slides down the slope of the bevels 786). In some embodiments, the force of the rotary motion provided by the interaction of the barb 740 and the bevels 786 can be sufficient to overcome a spring bias that is configured to otherwise urge the barb 740 toward the locked configuration.

Eventually, the barb 740 is rotated into the unlocked configuration relative to the receiver 750. In the unlocked configuration, the barb 740 can continue to penetrate the remainder of the thickness of the end wall 784 through the aperture 482. Once the barb has fully penetrated the end face 784, the barb 740 can be rotated back to the locked configuration, for example by energizing the rotary actuator 430 or by a spring bias configured to urge the barb 740 toward the locked configuration (e.g., to reversibly couple the structure 402 to the structure 401).

Figure 9B:
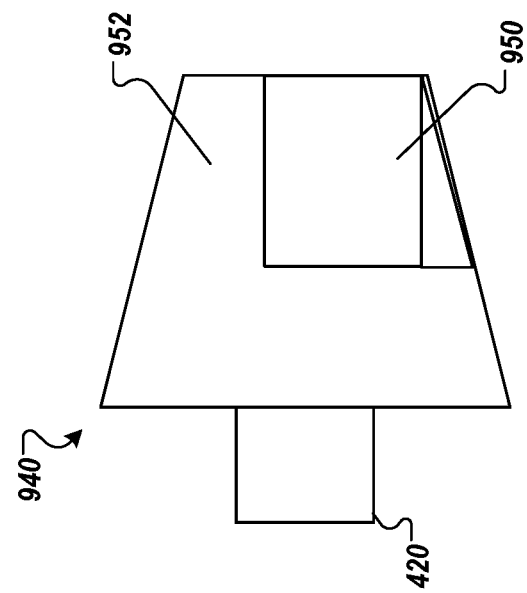
FIGS. 9A and 9B are side views of an exemplary barb with bevels.
Figure 9A:
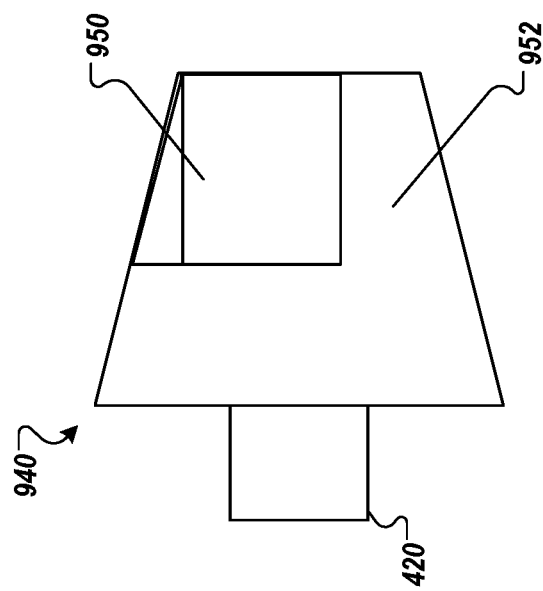

FIGS. 9A and 9B are opposing side views of an exemplary barb 940 with bevels. In some embodiments, the barb 940 can be the example barb 440 of FIGS. 4A and 4B, or the example barb 740 of FIG. 7.

The barb 940 is substantially similar to the example barb 440, except that the barb 940 includes a collection of bevels 950. The bevels 950 are configured as an angular, helical, or spiral slope that starts at a major face 952 of opposite sides of the barb 940, and slopes downward and rotationally though a portion of the thickness of the barb 940. In some embodiments, the bevels 950 can be complementary to the bevels 786 of the example receiver 750. In embodiments in which the barb 940 is used with the example system 700, when the receiver 750 is moved linearly toward the probe 710, the barb 740 contacts a portion of the bevels 950. The bevels 950 are configured to convert the linear motion between the receiver 750 and the probe 710 into rotary motion of the probe 710 (e.g., by urging rotation as the barb 740 slides down the slope of the bevels 950). In some embodiments, the force of the rotary motion provided by the interaction of the barb 740 and the bevels 950 can be sufficient to overcome a spring bias that is configured to otherwise urge the barb 740 toward the locked configuration.

Figure 10A:
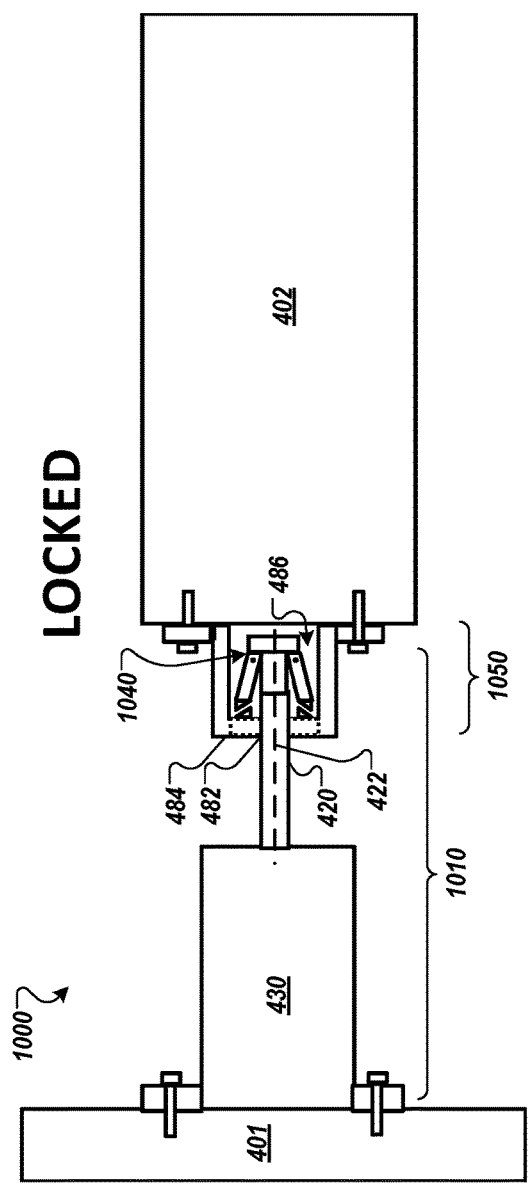
FIG. 10A is a sectional side view of another exemplary thrust reverser tertiary lock in a locked configuration.
Figure 10B:
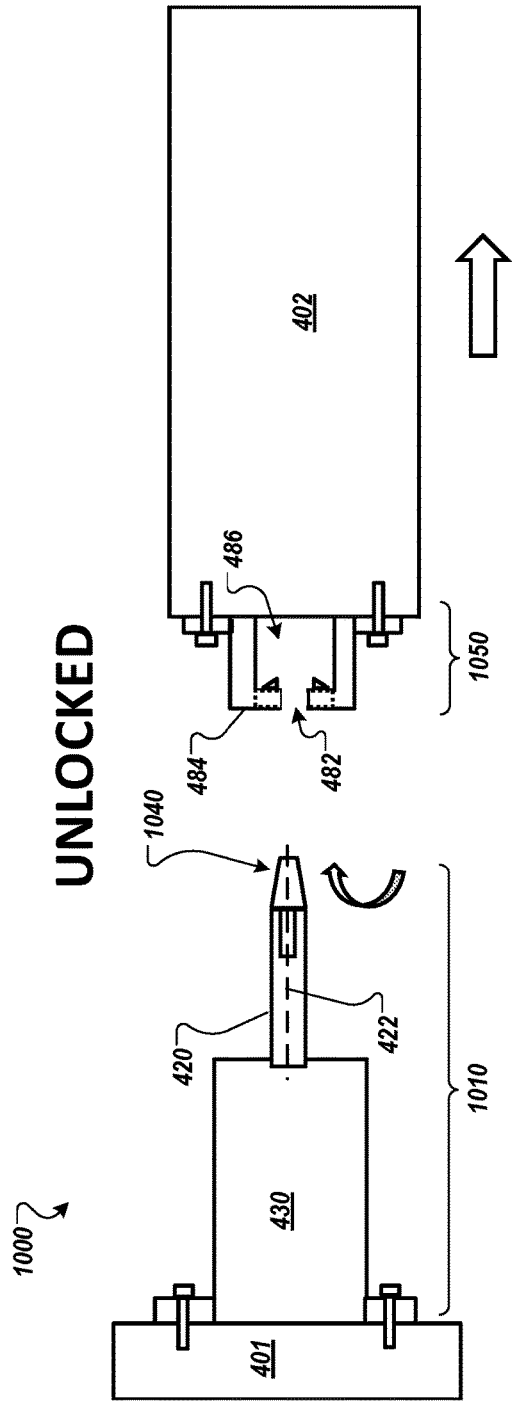
FIG. 10B is a sectional side view of another exemplary thrust reverser tertiary lock in an unlocked configuration.

FIG. 10A is a sectional side view of another exemplary thrust reverser tertiary lock system 1000 in a locked configuration. FIG. 10B is a sectional side view of the system 1000 in an unlocked configuration. In general, the system 1000 is substantially similar to the example system 400 of FIGS. 4A and 4B, but with a different barb configuration and receiver configuration. The system 1000 includes the structure 401 and the structure 402, which are releasably linked by a probe 1010 and a receiver 1050.

Figure 11B:
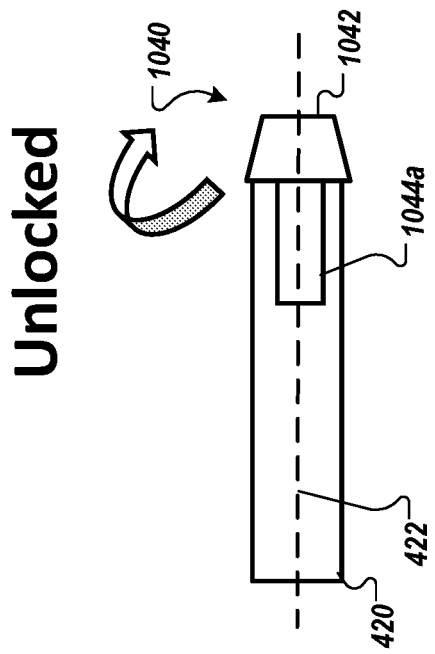
FIGS. 11A and 11B are side views of another exemplary barb.
Figure 11A:
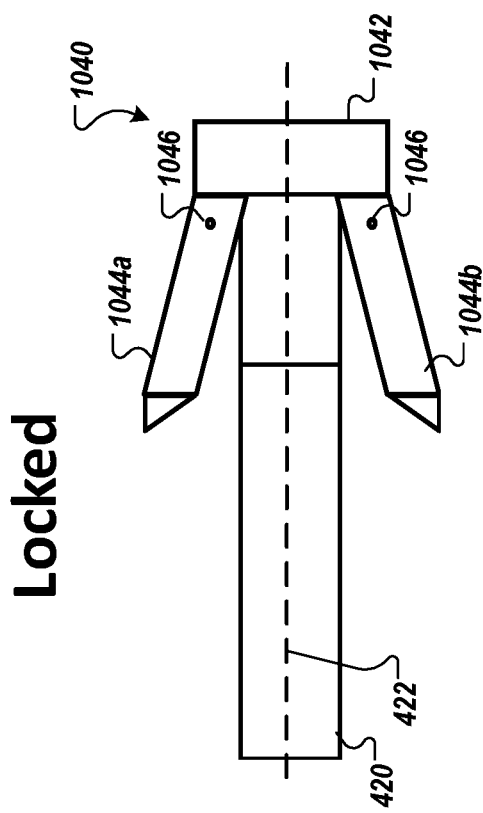

The probe 1010 includes the rotary actuator 430 and the shaft 420. The probe 1010 also includes a barb 1040. FIGS. 11A and 11B are magnified side views of the exemplary barb 1040 of FIGS. 10A and 10B in a locked configuration (e.g., FIG. 11A) and an unlocked configuration (e.g., FIG. 11B).

The barb 1040 includes a base 1042 that is affixed to the shaft 420. Extending angularly away from the base 1042 is an arm 1044a and an arm 1044b. The arms 1044a, 1044b are configured to pivot on pivot points 1046. A bias member (e.g., spring) (not shown) is configured to bias the arms 1044a, 1044b away from the shaft 420. When a force, greater than the bias force, is applied to the arms 1044a, 1044b, the arms 1044a, 1044b pivot toward a retracted position that is relatively more parallel with the shaft 420 than when in their extended, biased position.

The barb 1040 is rotationally asymmetrical about the longitudinal axis 422. For example, when the shaft 420 is rotated, the orientation of the barb 1040 can be changed to a position in that is not symmetrical about the longitudinal axis 422 relative to its original position. In the illustrated example, the arms 1044a, 1044b extend from opposite sides of the based 1042 a distance that is greater than the thickness of the base 1042 and shaft 420.

Referring again to FIGS. 10A and 11A, when rotated into the locked configuration, the barb 1040 mechanically interferes with the end wall 484 of the receiver 1050 and the receiver 1050 prevents escapement of the probe 1010. For example, when the arms 1044a, 1044b of the barb 1040 are rotated relative to the shape of the aperture 482 (e.g., 90 degrees in the illustrated example), the barb 1040 is retained with in the cavity 486. In such a locked, retained configuration, as shown in the illustrated example of FIG. 10A, the structure 402 is mechanically retained to the structure 401 through the system 1000. In use, such a locked and retained configuration can be used to lock a moveable portion of a thrust reverser to an engine frame or airframe to prevent inadvertent or accidental deployment of the thrust reverser.

Referring again to FIGS. 10B and 11B, when rotated into the unlocked configuration, the barb 1040 can fit through the aperture 482, which permits escapement of the barb 1040 from the cavity 486 through the end wall 484. In such an unlocked configuration, as shown in the illustrated example of FIG. 10B, the structure 402 is mechanically released from the structure 401. In use, such an unlocked configuration can permit movement of a moveable portion of a thrust reverser relative to an engine frame or airframe, for example, to permit deployment of the thrust reverser.

In some embodiments, the probe 1010 may be configured to remain in the locked configuration by default. For example, the shaft 420 may be biased to the locked configuration by a spring. When the rotary actuator 430 is energized, the rotary actuator 430 overcomes the spring bias to unlock the probe 1010. When the rotary actuator 430 is de-energized, the spring can urge the probe 1010 back to the locked configuration.

Figure 12:
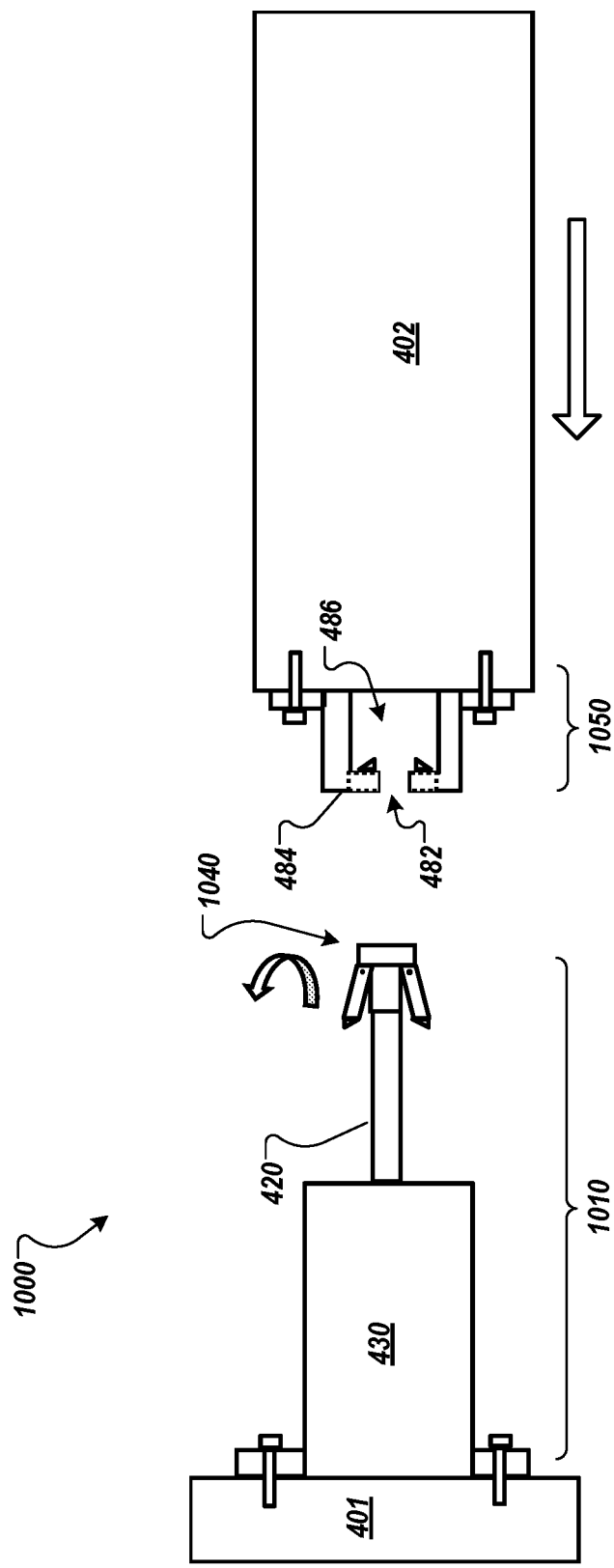
FIG. 12 is a sectional side view of another exemplary thrust reverser tertiary lock.

FIG. 12 is a side view of the exemplary thrust reverser tertiary lock system 1000 in a locked configuration while escaped. In the example system 1000, the end wall 484 prevents escapement of the probe 410 from engagement the receiver assembly 450 when locked. However, in some implementations (e.g., under some regulatory environments), the system 1000 may be configured to fail "safe" by permitting the structure 402 (e.g., a thrust reverser slider) to reengage and relock with the structure 401 (e.g., engine frame) even when the rotary actuator 430 has not been energized (e.g., by accident or by malfunction).

Figure 13:
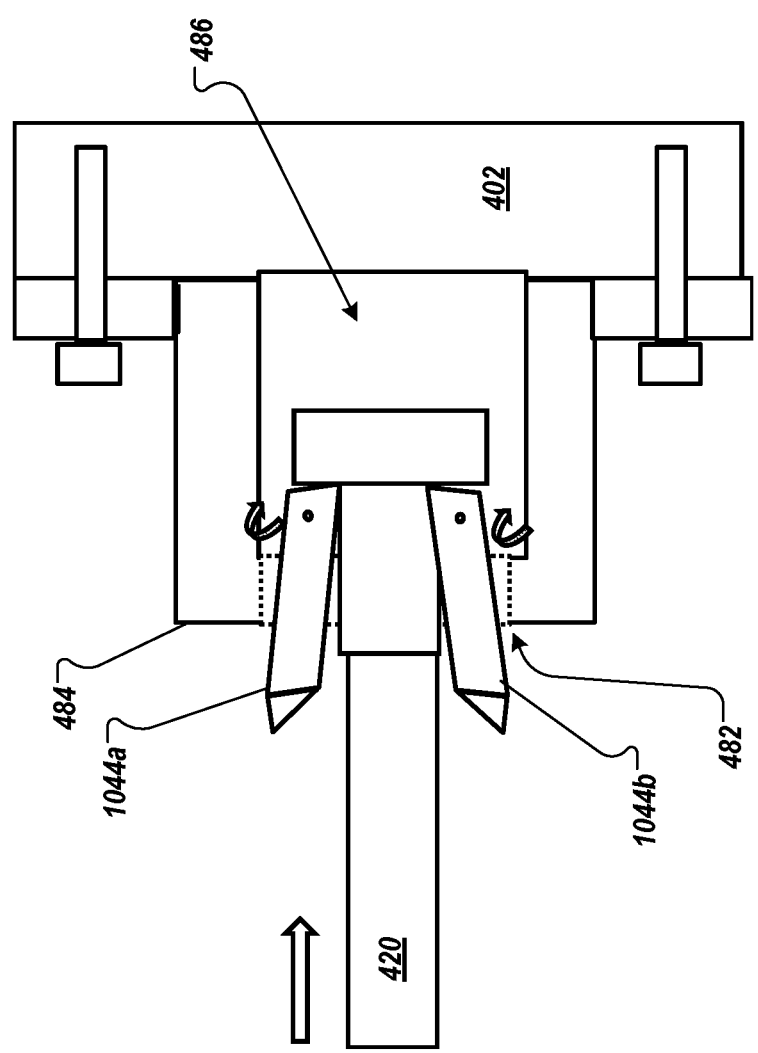
FIG. 13 is a zoomed sectional side view of another exemplary thrust reverser tertiary lock.

FIG. 13 is a zoomed sectional side view of the exemplary thrust reverser tertiary lock system 1000 of FIGS. 10A and 10B. The system 1000 includes modifications that can permit engagement of the probe 1010 to the receiver 1050 when locked and disengaged. For example, the system 1000 can secure the structure 402 to the structure 401 even when the rotary actuator 430 has not been energized prior to retraction of the structure 402 (e.g., somebody forgot to unlock the probe 1010 prior to retraction, the rotary actuator malfunctions and fails to move the probe 1010 to the unlocked configuration during retraction).

As discussed above, the barb 1040 is rotationally asymmetrical and can be rotated between a locked configuration and an unlocked configuration, and the end wall 484 includes the rotationally asymmetrical aperture 482 that is configured to prevent escapement of the barb 1040 from the receiver 1050 in the locked configuration. The arms 1044a, 1044b are configured to permit penetration of the end wall 484 by the barb 1040 while the barb 1040 is escaped and locked.

By default, the arms 1044a, 1044b are biased away from the shaft 420 toward an extended configuration that extends to a size that is relatively larger than the size of the aperture 482. When the arms 1044a, 1044b are folded back toward the shaft, the arms 1044a, 1044b have a retracted size that is relatively smaller than the size of the aperture 482.

As the receiver 1050 is moved linearly toward the probe 1010, the barb 1040 contacts a portion of the end wall 484. The arms 1044a, 1044b are configured to pivot or otherwise fold inward toward the shaft 420 as the barb 1040 penetrates through the aperture 482. The force of the linear motion is sufficient to overcome the spring bias that is configured to extend the arms 1044a, 1044b toward their extended configuration. With the arms 1044a, 1044b in the smaller, retracted position, the barb 1040 can fit through the aperture 482 even when the probe 1010 is in the locked configuration. Once the barb 1040 completely penetrates the end wall 484, the spring bias causes the arms 1044a, 1044b to snap back to their larger, extended positions, which locks the probe 1010 to the receiver 1050.

Figures 14A, 14B:
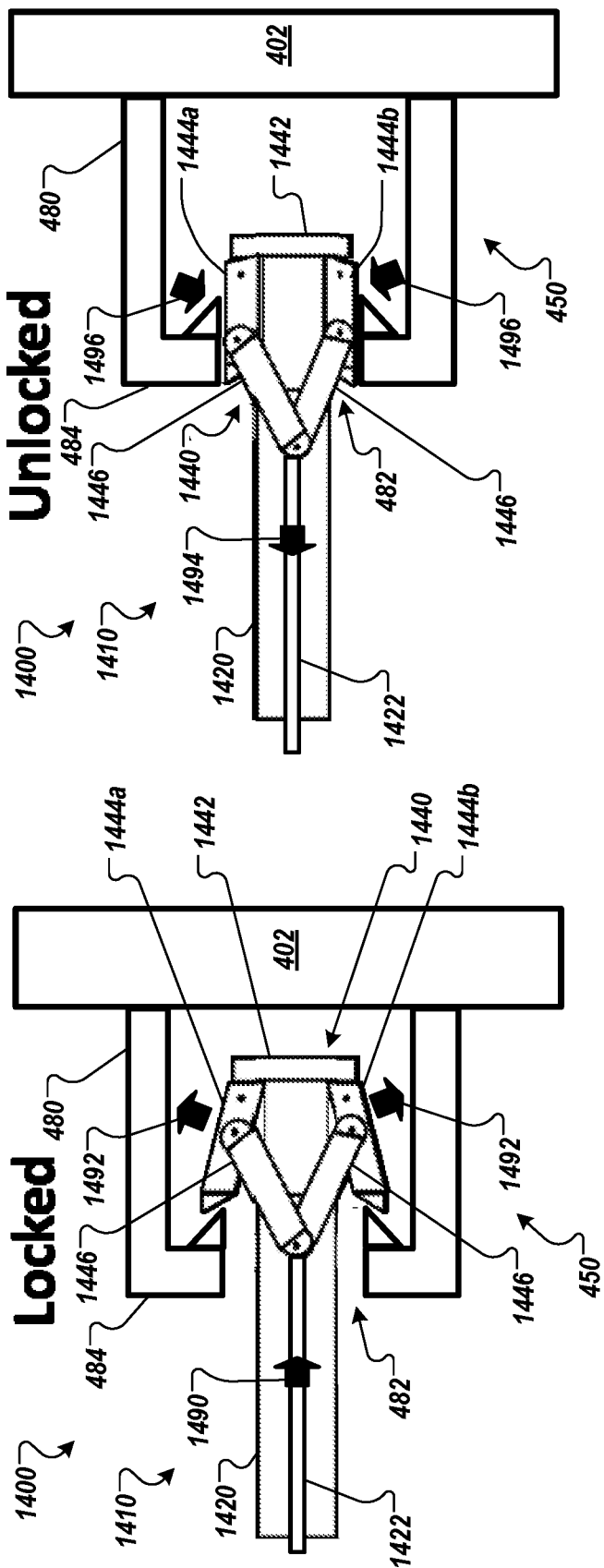
FIG. 14A is a zoomed side view of another probe in a locked configuration.
FIG. 14B is a zoomed side view of another exemplary probe an unlocked configuration.

FIGS. 14A and 14B show an example thrust reverser tertiary lock system 1400. FIG. 14A is a zoomed side view of an example probe 1410 in a locked configuration. FIG. 14B is a zoomed side view of the probe 1410 an unlocked configuration. In general, the probe 1410 is substantially similar to the example probe 1010 of FIGS. 10A and 10B, but includes a barb 1440 that is actively extendible and retractable instead of, or in addition to, being rotatable.

The probe 1410 includes a shaft 1420. The probe 1410 also includes a barb 1440. The barb 1440 includes a base 1442 that is affixed to the shaft 420. Extending angularly away from the base 1442 is an arm 1444a and an arm 1444b. The arms 1444a, 1444b are configured to pivot relative to the base 1442. A pair of linkages 1446 are pivotably connected at their first ends to the arms 1444a, 1444b, and are pivotably connected at their second ends to an actuation rod 1422. The actuation rod 1422 is coupled to a linear actuator (not shown) configured to urge linear movement of the actuation rod 1422. Linear movement of the actuation rod 1422 (e.g., substantially parallel to the shaft 1420) extends and retracts the arms 1444a, 1444b, as will be discussed further below.

Referring to FIG. 14A, when the actuation rod 1422 is urged toward the barb 1440, as indicated by the arrow 1490, the linkages 1446 push into the arms 1444a and 1444b, urging the arms 1444a, 1444b to pivot, as indicated by the arrows 1492, toward an extended position that is relatively larger than the size of the aperture 482. In the extended, locked configuration, the end wall 484 mechanically interferes with the barb 1440 and prevents disengagement of the probe 1410 from the receiver assembly 450.

Referring to FIG. 14B, when the actuation rod 1422 is urged away from the barb 1440, as indicated by the arrow 1494, the linkages 1446 pull upon the arms 1444a and 1444b, drawing the arms 1444a, 1444b to pivot, as indicated by the arrows 1496, toward a retracted position that is relatively smaller than the size of the aperture 482. In the retracted, unlocked configuration, the end wall 484 does not mechanically interferes with the barb 1440 to prevent disengagement of the probe 1410 from the receiver assembly 450.

Figure 15:
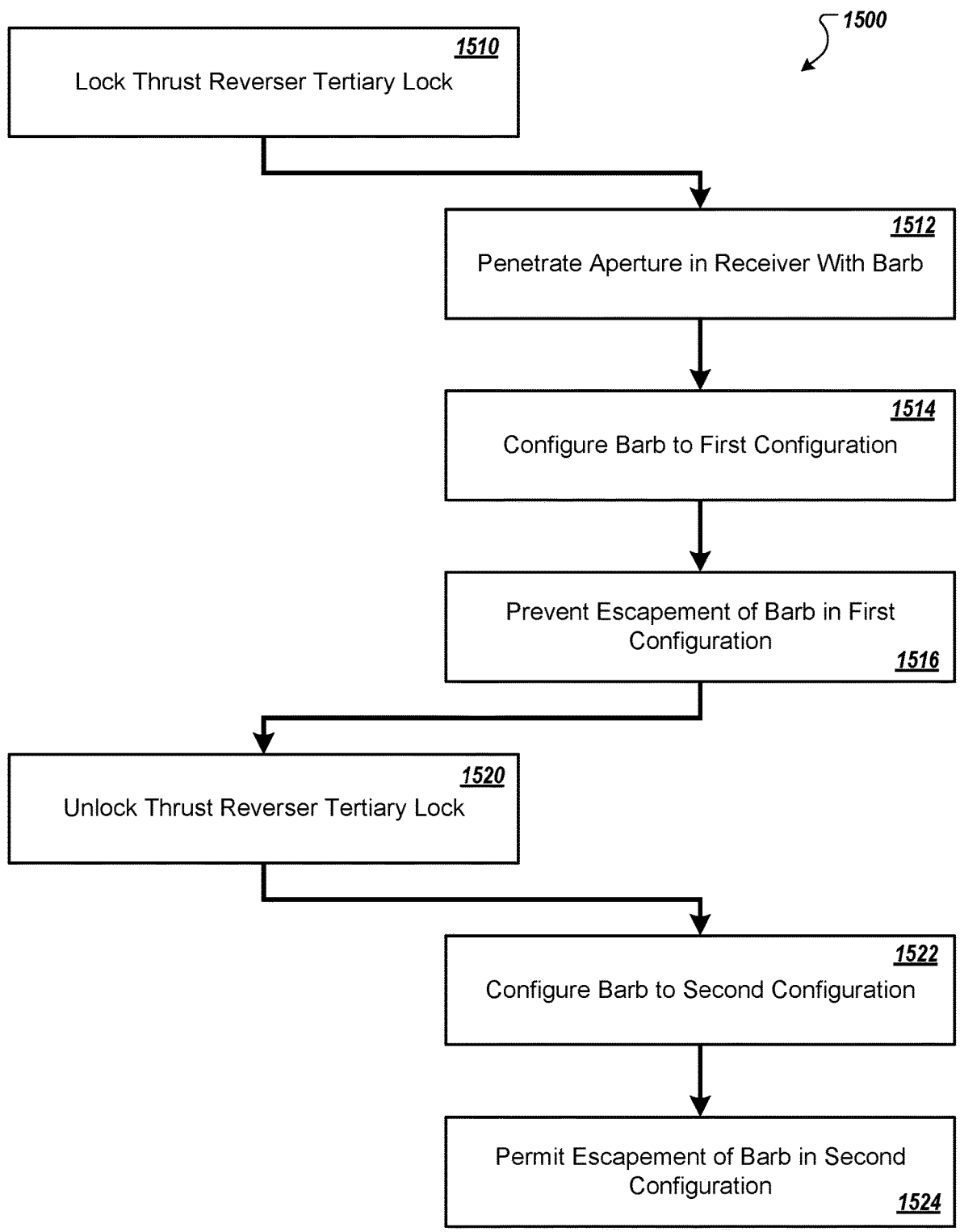
FIG. 15 is a flow diagram of an example process of locking and unlocking a thrust reverser tertiary lock.

FIG. 15 is a flow diagram of an example process 1500 of locking and unlocking a thrust reverser tertiary lock. In some implementations, the process 1500 can be used with the example thrust reverser tertiary lock system 400 of FIGS. 4A-6D, the example thrust reverser tertiary lock system 700 of FIGS. 7-9B, the example thrust reverser tertiary lock system 1000 of FIGS. 10A-13, and/or the example thrust reverser tertiary lock system 1400 of FIGS. 14A and 14B.

At 1510, a thrust reverser tertiary lock is locked. For example, the thrust reverser tertiary lock system 400 can be locked. To lock the lock, several steps are performed.

At 1512, a barb at a first end of a shaft of a probe penetrates an aperture defined in an end wall of a receiver shaped to accommodate the barb. For example, the receiver assembly 450, as depicted in FIG. 4B, can be moved linearly closer to the probe 410 until the barb 440 penetrates the aperture 482.

At 1514, the barb is configured to a first configuration. For example, the probe 410 can be reconfigured to the locked configuration as depicted in FIG. 4A.

At 1516 escapement of the barb, in the first configuration, though the aperture is prevented by the end wall. For example, if the receiver assembly 450 is moved away from the probe 410, the barb 440 will be caught by the end wall 484 and prevented from escaping. As such, the structure 402 will be locked to the structure 401.

In some embodiments, locking the thrust reverser tertiary lock can also include configuring, while in an escaped configuration, the barb to the first configuration, contacting the barb to an edge of the aperture, wherein contact between the barb and the edge urges the barb from the first configuration to the second configuration, penetrating, by the probe, the aperture, and reconfiguring, after the barb has passed through the aperture, the barb to the first configuration. In some embodiments, the barb includes a bevel configured to contact the edge of the aperture and urge rotation of the barb about a primary axis of the shaft from the first configuration to the second configuration during penetration of the aperture by the barb. For example, the barb 940 includes the bevels 950 that can contact the edges of the aperture 482 to urge rotation of the barb 940 to permit penetration of the end wall 784 by the barb 940. In some embodiments, the edge of the aperture can include a bevel configured to contact the barb and urge rotation of the barb about a primary axis of the shaft from the first configuration to the second configuration during penetration of the aperture by the barb. For example, the end wall 784 includes the bevels 786 that can urge rotation of the barb 740 to permit penetration of the end wall 784 by the barb 940.

In some embodiments, reconfiguring, after the barb has passed through the aperture, the barb to the first configuration, can include rotating, by a torsion bias spring, the barb about the axis from the first configuration to the second configuration after the barb has completed penetration of the bevel. For example, the barb 740 can be spring-biased by a torsion spring (not shown) connected to the shaft. The rotary actuator 430, the bevels 786, and/or the bevels 950 can torque the shaft against the force of the spring, and once the barb 740 has passed through the aperture 782, the force of the spring can snap the barb 740 into the locked configuration.

In some embodiments, the barb can include an arm having a first end that is pivotably connected to the shaft and configured to contact an edge of the aperture and pivot toward the shaft from the first configuration to the second configuration to pass through the aperture during penetration of the end wall by the barb, and configured to pivot away from the shaft from the second configuration to the first configuration and interfere with escapement of the barb in the first configuration. For example, the barb 1040 includes the arms 1044a, 1044b that can fold back to permit passage of the barb 1040 through the aperture 482, and expand to prevent escapement of the barb 1040 through the end wall 484.

At 1520, the thrust reverser tertiary lock is unlocked. For example, the thrust reverser tertiary lock system 400 can be unlocked. To unlock the lock, several steps are performed.

At 1522, the barb is configured to a second configuration. For example, the barb 440 can be reconfigured to the unlocked configuration. In the unlocked configuration, the barb 440 can fit through the aperture 482.

At 1524 escapement of the barb through the aperture in the second configuration is permitted. For example, when the barb 440 is in the unlocked configuration and the structure 402 is moved linearly away from the structure 401, the barb 440 can pass through the aperture 482, allowing the structure 402 to be unlocked from the structure 401.

In some embodiments, configuring the barb to the first configuration can include rotating, by a rotary actuator, the barb about an axis from a second rotary position to a first rotary position. For example, the rotary actuator 430 or a spring can rotate the barb 440 to the unlocked configuration shown in FIGS. 4B, 6B, and 6D.

In some embodiments, configuring the barb to the second configuration can include rotating, by a rotary actuator, the barb about an axis from a first rotary position to a second rotary position. For example, the rotary actuator 430 or a spring can urge rotation of the barb 440 to the locked configuration shown in FIGS. 4A, 6A, and 6C.

In some embodiments, the barb can have a first size in the first configuration and can have a second size in the second configuration, wherein the second size is smaller than the aperture such that the barb is able to penetrate and escape the aperture in the second configuration, and the first size is larger than the aperture such that the barb is retained by the receiver and escapement of the barb through the aperture is prevented by interference between the barb and the end wall in the first configuration, wherein configuring the barb to the first configuration can include actuating, by a linear actuator, at least one arm linked to the linear actuator, extending, based on the actuating, the arm from the second configuration in which the arm extends from the shaft a first distance to define the first size, to the first configuration in which the arm extends from the shaft a second distance greater than the first distance to define the second size. In some embodiments, the barb can have a first size in the first configuration and has a second size in the second configuration, wherein the second size is smaller than the aperture such that the barb is able to penetrate and escape the aperture in the second configuration, and the first size is larger than the aperture such that the barb is retained by the receiver and escapement of the barb through the aperture is prevented by interference between the barb and the end wall in the first configuration, wherein configuring the barb to the first configuration can include actuating, by a linear actuator, at least one arm linked to the linear actuator, and retracting, based on the actuating, the arm from the first configuration in which the arm extends from the shaft a first distance to define the first size, to the second configuration in which the arm extends from the shaft a second distance less than the first distance to define the second size. For example, the actuation rod 1422 can be moved linearly by a linear actuator to cause the arms 1444a, 1444b to extend and retract, expanding and shrinking the overall size of the barb 1440. In the expanded configuration, the barb 1440 is too large to be retracted back through the aperture 482. In the retracted configuration, the barb 1440 is small enough to be escapable from the receiver assembly 450 through the aperture 482.

In some embodiments, the barb can be is spring-biased to the first size. For example, the barb 440 can be spring biased to the locked rotational position in which the rotational position of the barb 440 relative to the aperture 482 makes the barb 440 too large to escape through the aperture 482. In another example, the arms 1044*a*, 1044*b* of the barb 1040 can be spring biased to the larger, open configuration. In another example, the actuation rod 1422 and/or the arms 1444*a*, 1444*b* can be spring biased to cause the arms 1444*a*, 1444*b* to open to the larger, open configuration.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A thrust reverser tertiary lock apparatus comprising:
   a probe affixed to an aircraft engine frame and comprising a shaft having a barb at a first end and rotatable about an axis to a first configuration and a second configuration; and
   a receiver affixed to a thrust reverser transcowl slider or door configured to accommodate the barb and comprising an end wall having an aperture defined therein, the aperture shaped to permit escapement of the barb in the first configuration and prevent escapement of the barb in the second configuration;
   wherein the barb comprises a bevel configured to contact an edge of the aperture and urge rotation of the barb about the axis from the second configuration to the first configuration during penetration of the aperture by the barb.

2. The thrust reverser tertiary lock apparatus of claim 1, further comprising a rotary actuator configured to rotate the barb about the axis, wherein the barb is rotatable by the rotary actuator between the first configuration and the second configuration.

3. The thrust reverser tertiary lock apparatus of claim 2, wherein the aperture is rotationally asymmetric relative to the axis and the barb is rotationally asymmetric about the axis between the first configuration and the second configuration, such that the barb is escapable from the receiver through the aperture in the first configuration and the barb is interfered with by the end wall such that escapement of the barb is prevented in the second configuration.

4. The thrust reverser tertiary lock apparatus of claim 2, wherein the barb is configured to rotate to the first configuration when activated and rotate to the second configuration when deactivated.

5. The thrust reverser tertiary lock apparatus of claim 2, wherein an edge of the aperture comprises a bevel configured to contact the barb and urge rotation of the barb about the axis from the second configuration to the first configuration during penetration of the aperture by the barb.

6. The thrust reverser tertiary lock apparatus of claim 5, further comprising a torsion bias spring configured to rotate the barb about the axis from the first configuration to the second configuration after the barb has completed penetration of the bevel.

* * * * *